US010622139B2

(12) United States Patent
Wolfe, Sr. et al.

(10) Patent No.: US 10,622,139 B2
(45) Date of Patent: Apr. 14, 2020

(54) DIFFERENTIAL-COIL, SOLENOID TYPE, HIGH VOLTAGE SERIES REACTOR

(71) Applicants: Jerry J Wolfe, Sr., Beaverton, OR (US); Anthony F. Sleva, Beaverton, OR (US)

(72) Inventors: Jerry J Wolfe, Sr., Beaverton, OR (US); Anthony F. Sleva, Beaverton, OR (US)

(73) Assignee: Prescient Transmission Systems, Inc., Beaverton, OR (US)

( * ) Notice: Subject to any disclaimer, the term of this patent is extended or adjusted under 35 U.S.C. 154(b) by 51 days.

(21) Appl. No.: 15/804,134

(22) Filed: Nov. 6, 2017

(65) Prior Publication Data

US 2019/0139699 A1 May 9, 2019

(51) Int. Cl.

| | |
|---|---|
| ***H01F 27/28*** | (2006.01) |
| ***H01F 29/10*** | (2006.01) |
| ***H01F 38/02*** | (2006.01) |
| ***H01F 7/16*** | (2006.01) |
| ***H02H 9/02*** | (2006.01) |
| ***H01F 27/38*** | (2006.01) |

(52) U.S. Cl.

CPC ........... *H01F 29/10* (2013.01); *H01F 7/1607* (2013.01); *H01F 27/28* (2013.01); *H01F 27/38* (2013.01); *H01F 38/023* (2013.01); *H02H 9/02* (2013.01)

(58) Field of Classification Search

CPC ................................................ H01F 27/00–36

USPC ..... 336/65, 90, 96, 210, 211, 212, 214–219, 336/233–234

See application file for complete search history.

(56) References Cited

U.S. PATENT DOCUMENTS 1,696,615 A * 12/1928 Trombetta ............ H01F 7/1205 335/245

FOREIGN PATENT DOCUMENTS

JP 01161701 A * 6/1989

* cited by examiner

*Primary Examiner* — Tuyen T Nguyen

(74) *Attorney, Agent, or Firm* — Mersenne Law

(57) ABSTRACT

Differential-coil, high-voltage series reactors respond quickly and reliably to current surges in electrical power systems (such as surges caused by shorted or downed lines). The reactors prevent voltage collapse and eliminate the possibility of wide area blackouts (major metropolitan areas or entire states).

8 Claims, 4 Drawing Sheets

DIFFERENTIAL-COIL, SOLENOID TYPE, HIGH VOLTAGE SERIES REACTOR

CONTINUITY AND CLAIM OF PRIORITY

This is an original U.S. patent application.

FIELD

The invention relates to emergency protective circuit arrangements for limiting excess current or voltage without disconnection, which arrangements are responsive to excess current. More particularly, the invention relates to variable impedance devices suitable for automatically limiting short-circuit current and maintaining power system voltage in a high-voltage transmission environment.

BACKGROUND

The electrical grid in many developed countries is a large-scale, distributed, cooperative system that functions to deliver power from production facilities such as hydroelectric generators, solar and wind farms, and fossil-fuel plants, across high-voltage transmission lines, to lower-voltage local distribution systems. Portions of the system include protective devices to prevent faults and failures in one area from affecting or damaging equipment in other areas.

When a short circuit occurs (e.g., due to power lines downed during a storm), the system voltage in the region drops to or near zero. Until the short is cleared, power transfer from generators to motors will be very low. If the current into a shorted region could be limited, the voltage drop could be similarly ameliorated. For example, if the system voltage only fell to 50% of nominal (rather than to only a few percent of nominal, or even zero), then power transfer from generators to motors could be maintained at near-normal levels, until the short circuit is cleared.

High-voltage series reactors having fixed impedance and no moving parts are occasionally placed in series with load conductors. These reactors have a fixed impedance on the order of one to a few ohms. The impedance limits system short-circuit current proportionally to the system voltage (by Ohm's Law, I=V/R).

Another known device type of relevance to the invention is a solenoid. These are wound coils with a moveable pole piece that are typically used in a shunt configuration (i.e., as the load across a voltage source). Excessive current may be avoided by providing a large number of windings, or by limiting the source voltage. A solenoid turns electrical power into mechanical work by moving the pole piece; the motion may ring a doorbell or latch or unlatch a car door, for example.

SUMMARY

An embodiment of the invention is an electrical component comprising a plurality of coils, at least two of which are wound in different directions. The coils act on a moveable pole piece, and motion of the pole alters the impedance of the component. When the pole piece is in the "at rest" position, the impedance is low. When the pole piece is in the "actuated" position, the impedance increases. The increased impedance reduces the current that can flow through the component (at a particular voltage). When used in a series configuration, this variable-impedance characteristic allows the component to protect the circuit against excessive current, prevents zero voltage on the power grid, and facilitates power transfer capability during short circuit conditions. (Power transfer is a function of sending end voltage and receiving end voltage. The subject invention will actuate when excessive current flows, change the impedance to the short circuit and thereby increase the sending end and receiving end voltage.)

DETAILED DESCRIPTION

Embodiments of the invention are two-terminal electromagnetic devices that present a variable impedance according to the present physical configuration of a moveable, magnetically-susceptible pole piece in relation to magnetic fields created by current passing through coils in the device. Since the currents of interest can be very high, the magnetic fields and forces on the pole piece are also high, which complicates the mechanical design of the device. Embodiments use coils with opposite windings to cancel some of the magnetic field, resulting in lower felt forces but similar electrical impedance changes.

Figure 1:
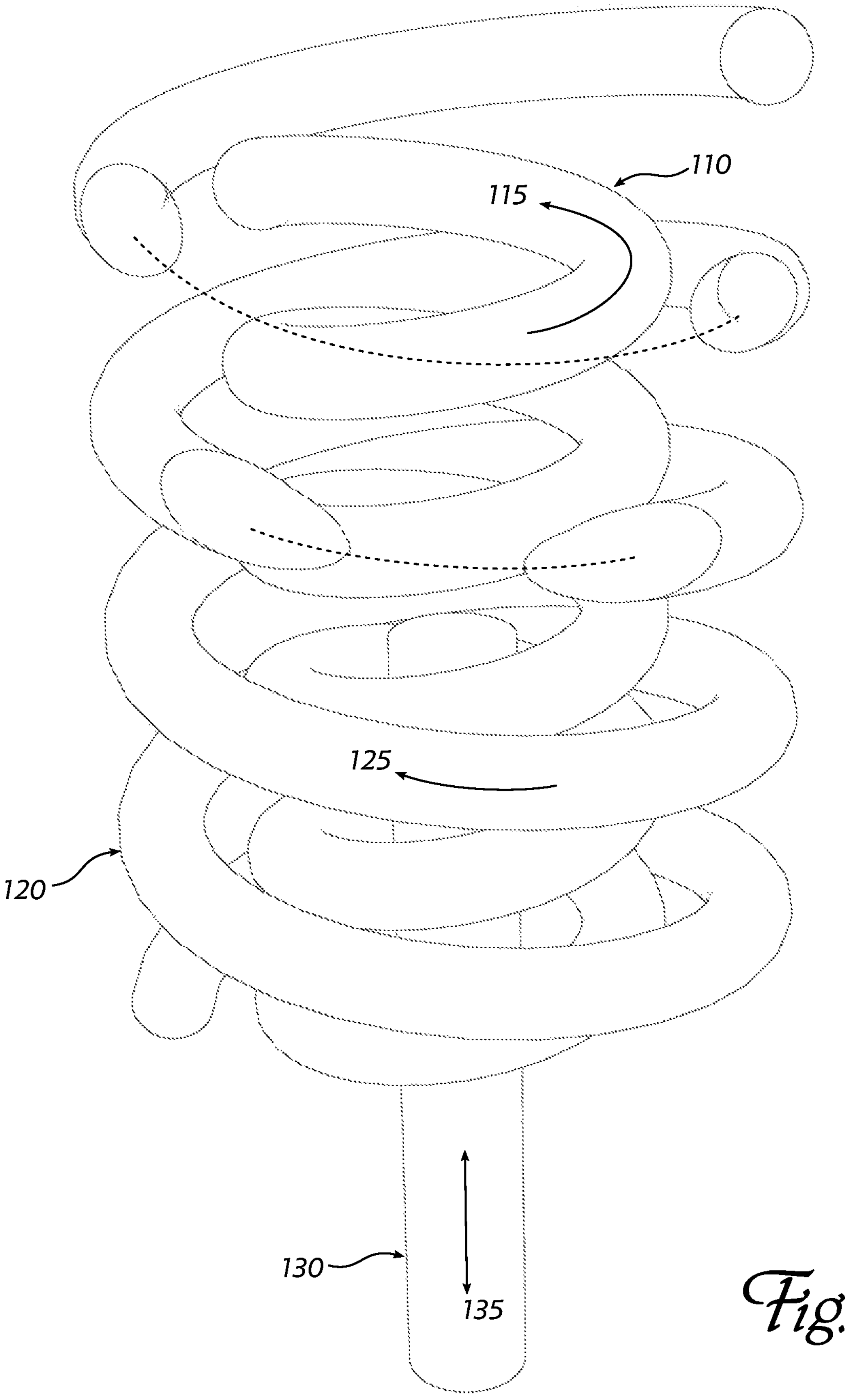
FIG. 1 shows a partially cut away view of principal parts of an embodiment.

FIG. 1 shows the principal components of an embodiment of the invention. A first conductive coil 110, wound in a first direction 115; and a second conductive coil 120, wound in a second, different direction 125 (partially cut away in this figure) are arranged so that their magnetic fields (when conducting current) affect a moveable pole piece 130, which is able to move 135 relative to the coils 110 and 120 (and which does move when the current in the coils changes in certain ways). Supporting structures and environment are not shown in this figure.

Figure 2A:
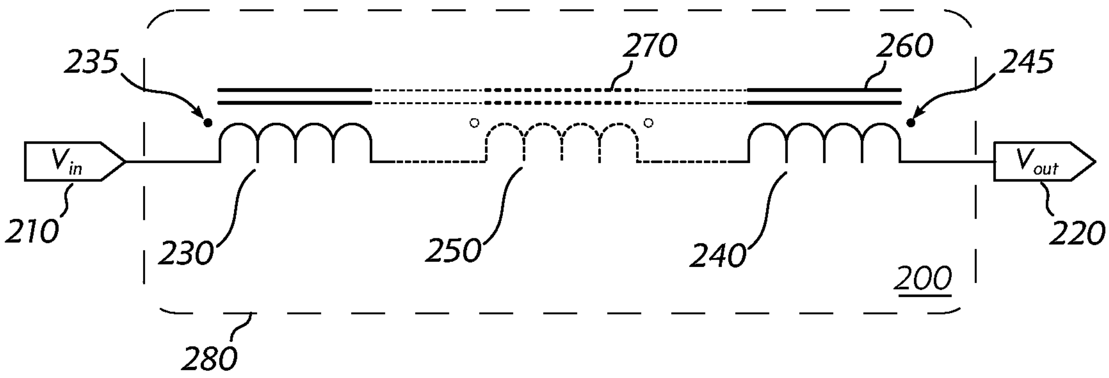
FIGS. 2A and 2B show alternate electrical arrangements of embodiments.
Figure 2B:
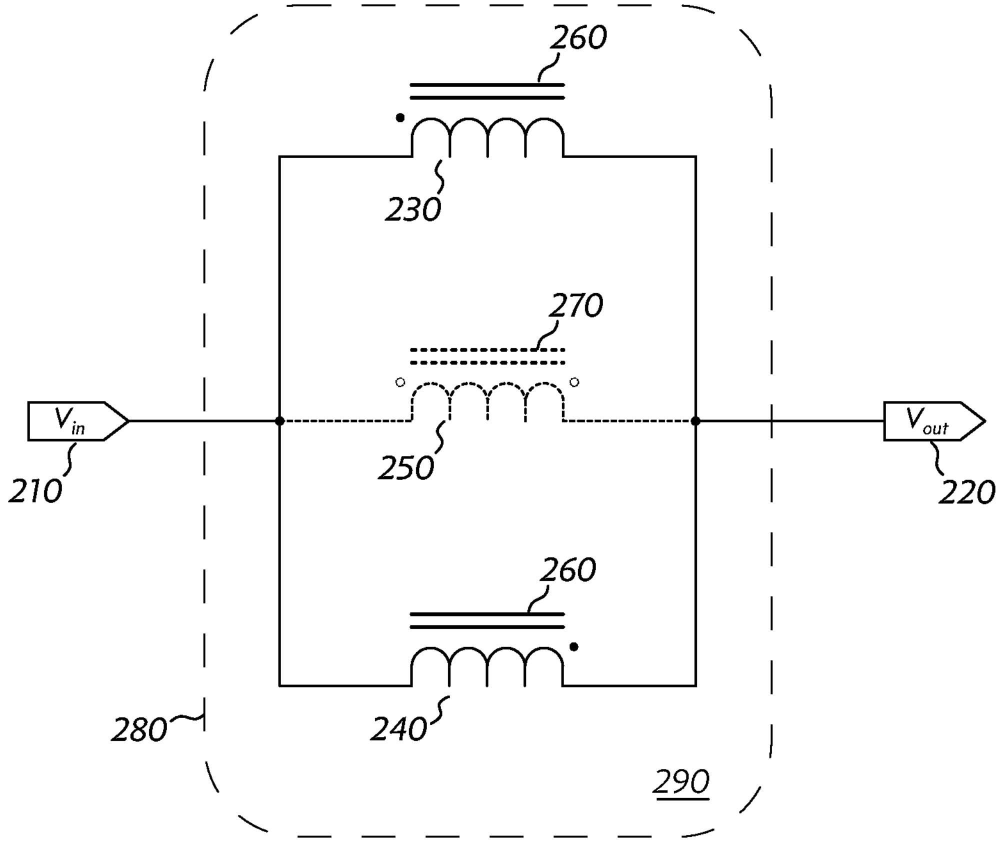

FIGS. 2A and 2B show two arrangements of embodiments in circuit-diagram form. An embodiment is basically a two-terminal device (200, 290; terminals identified in these figures as $V_{in}$ (210) and $V_{out}$ (220). In the embodiments, a first coil 230 is electrically connected with a first terminal ($V_{in}$ 210); and a second coil 240 is electrically connected with a second terminal ($V_{out}$ 220). An embodiment may comprise one or more additional coils 250, which may be connected to one or both terminals, or to one of the other coils in the embodiment. FIG. 2A shows the coils connected in electrical series, while FIG. 2B shows the coils connected in electrical parallel.

The first and second coils of an embodiment (230, 240) are wound in different directions, as shown by the placement of indicator dots 235 and 245. Additional coils 250 may be wound in either direction to achieve the characteristics described below. Furthermore, in preferred embodiments, the first and second coils have different turn counts.

Finally, in an embodiment, each coil is associated with a moveable, magnetically-susceptible pole piece (260). (The pole piece 260 is sized and positioned relative to all the coils so that each coil affects the pole piece [and vice-versa].) An embodiment is surrounded by a laminated steel frame assembly 280.

The coils are connected so that electrical current can flow from one terminal to the other when a voltage is applied across the terminals. This current causes each coil to generate a magnetic field, and the magnetic fields affect the moveable pole piece. When the current through the device is below a predetermined level, the pole piece occupies an at-rest position, and the impedance of the device assumes a first, lower value. When the current exceeds the predetermined value (e.g., when the system suffers a short circuit), the magnetic fields increase and cause the moveable pole piece to move to an active position, which causes an increase in device impedance.

In use, an embodiment of the invention is placed in series with a supply conductor, where it provides variable, but preferably small, impedance. The function of the impedance is to limit current if the supply is short circuited. The variability of the impedance is a function of the moveable pole piece, and motion of the pole piece is caused by excessive current. Thus, the device automatically increases impedance in response to a current surge, thereby protecting the system from voltage collapse. If the short or other excessive load condition continues, a prior-art mechanical circuit breaker can interrupt the circuit completely. An embodiment of the invention provides faster response because it is always "on;" and the current limit of the embodiment in its higher-impedance state relieves some of the stress that could impair operation of the power grid.

Design of an Exemplary Embodiment

The principles of the present invention lend themselves to circuit protective devices suitable for a variety of situations, but a common and extremely favorable application is in protecting high-current, high-voltage electrical distribution systems during short-circuit conditions. The design of an embodiment for this application will be discussed here. The target voltage range is 15 kV~500 kV, and the target current range is 600 A~3000 A.

At these levels, there are two principal challenges to developing a high-voltage solenoid-type series reactor according to an embodiment of the invention. First, the high current value causes strong magnetic fields in the coils, which exert a large force on the moveable magnetically-susceptible pole piece. The force can be moderated by reducing the number of turns in the coil (because the force is proportional to the current times the turns), but reducing the number of turns increases the turn-to-turn voltage differential, which complicates the design of the concentric coils.

Embodiments of the invention solve these problems by providing at least two coils, wound in opposite directions, so that their magnetic fields cancel. To maintain a net force to operate the moveable pole piece, different numbers of turns between the coils may be used. The net force is proportional to the difference in turns (rather than the total number of turns), but the turn-to-turn withstand voltage is divided by the total number of turns per concentric coil (so it is easier to insulate).

Figure 3:
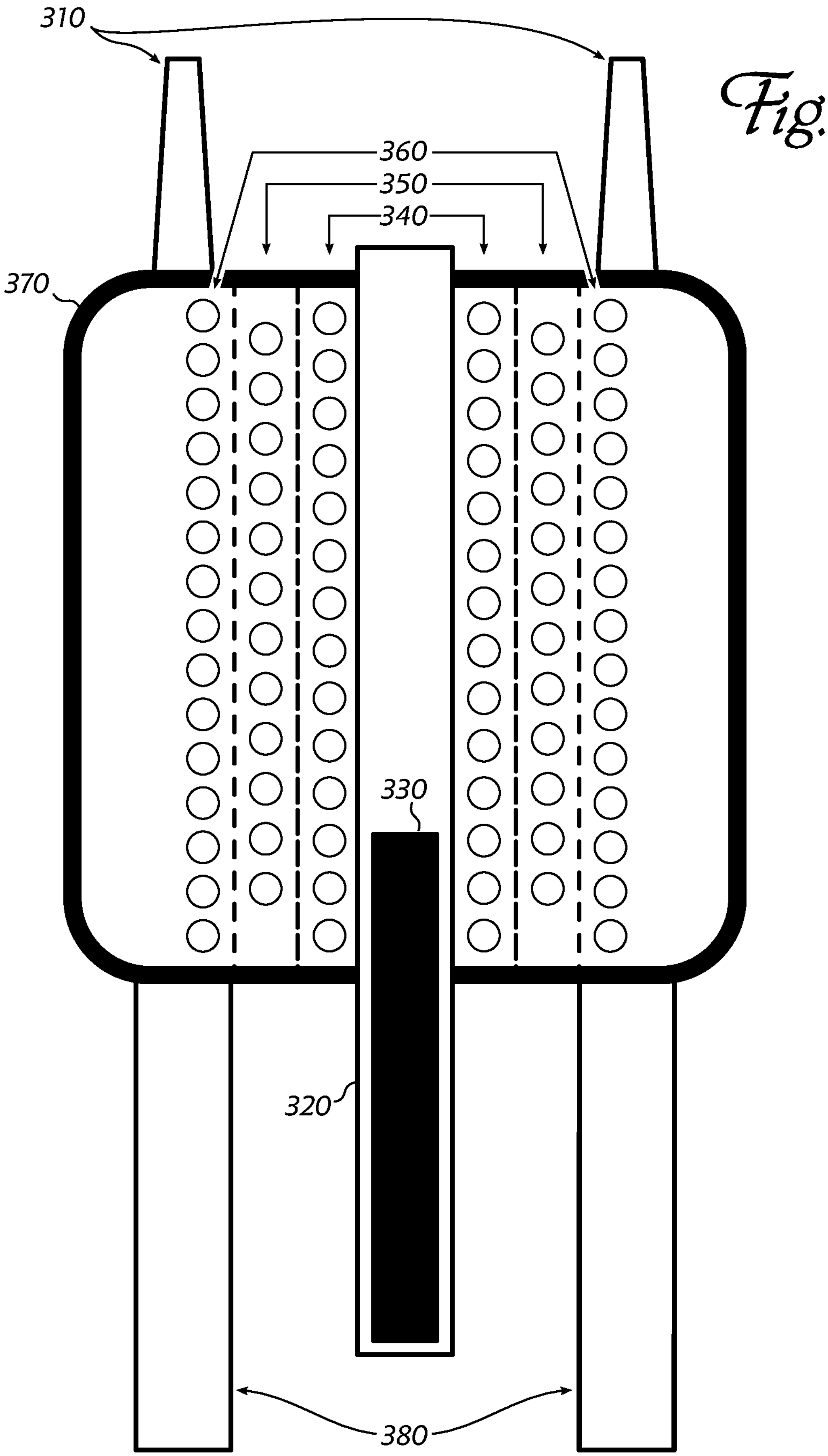
FIG. 3 shows a simplified physical arrangement of an embodiment with support structures and high voltage bushings.

FIG. 3 shows a cutaway view of a simplified high-voltage solenoid-type series reactor according to an embodiment of the invention. At the top of the figure are high-voltage bushings 310, where the embodiment can be connected in series to the power line to be protected. A hollow, nonconductive spool piece 320 provides a path for the moveable pole piece 330, and also supports the first or innermost electrical coil 340. (Since this is a cutaway view, coils appear as columns of circles, where each pair of circles on opposite sides of the spool piece 320 represents one turn of that coil.)

Further out from the first coil, a second nonconductive spool piece (heavy vertical dashed lines, no reference character) supports a second coil 350, and finally, an outermost concentric spool piece supports an outermost coil 360. As explained earlier, the coil winding directions are different. (Since there are two possible winding directions, e.g. clockwise and counterclockwise, in a three-coil embodiment like the one shown here, two coils will be wound in one direction, and one coil will be wound in the other direction. Furthermore, coils may have different numbers of turns.)

The choice of coil conductor is governed by the required ampacity (e.g., 600 A, 1200 A, 2000 A or 3000 A). The choice of coil spacing and insulation is governed by the operating voltage. And the coil (and/or spool piece) diameters are governed by the minimum bend radius of the chosen conductor. If the conductor insulation withstand voltage is sufficient, all coils may be wound onto a single pole piece (i.e., outer coils are wound directly on inner coils).

The moveable pole piece 330 may be held in the "at rest" position by a spring or similar element, or by gravity. When an excess-current event occurs, the net magnetic field of the coils will pull the moveable pole piece to the "actuated" position, thus increasing the impedance of the device and limiting the excess current. Limiting the current also allows the system voltage to recover to its nominal range. When the circuit is interrupted (or when the short-circuit is cleared), the spring or gravity may automatically move the pole piece back to the low-impedance position.

Most embodiments will be enclosed in a laminated iron core 370 (and if necessary, further enclosed within suitable weather-resistant enclosures, not shown). Most will rest on post-type standoff insulators 380.

Figure 4:
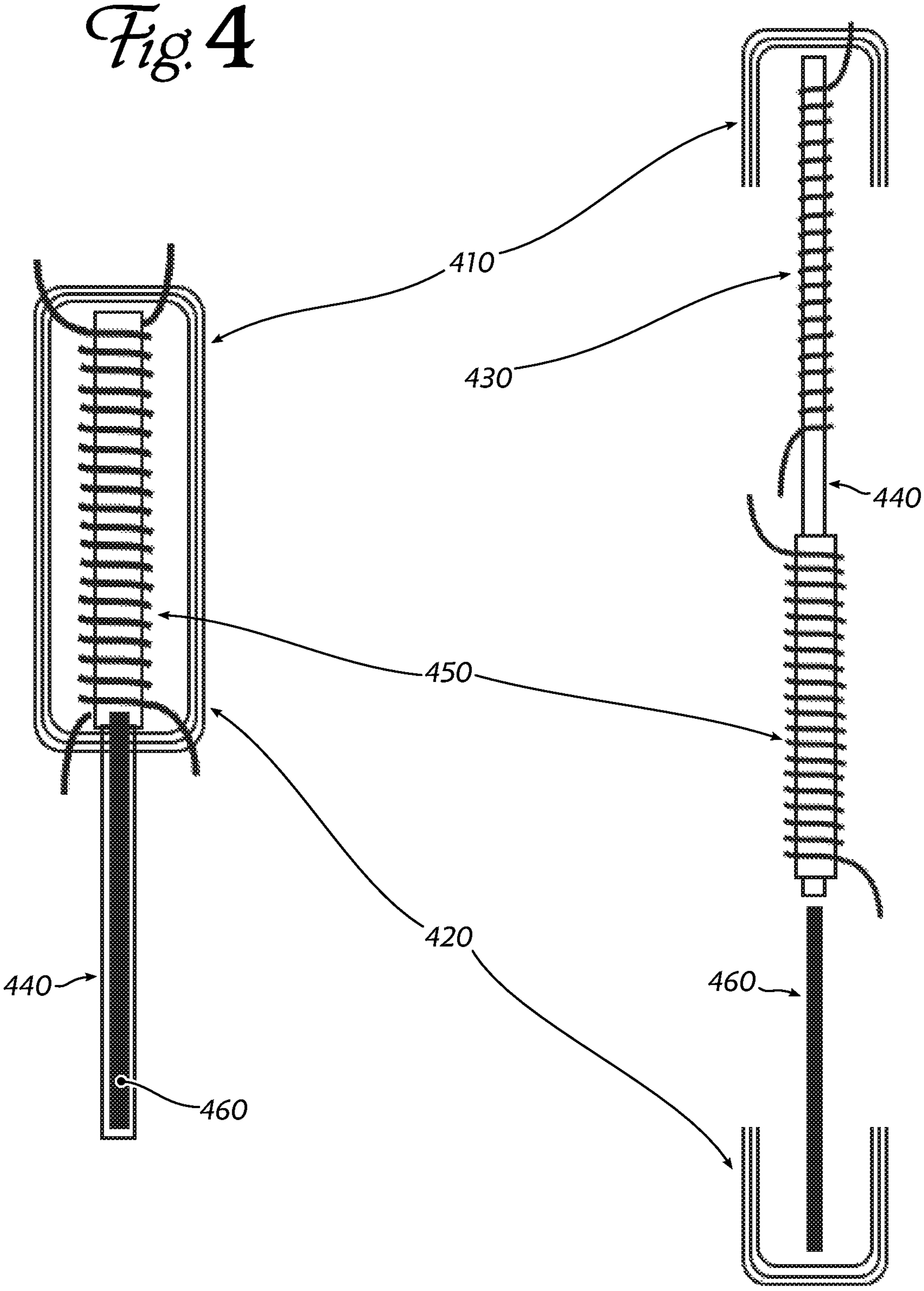
FIG. 4 shows another embodiment, in assembled and exploded forms.

FIG. 4 shows another view of components of an embodiment in assembled and exploded form. This embodiment is surrounded by a laminated steel frame, 410 & 420. One coil 430 (wound in a first direction) is only visible in the exploded view; it is inside the other coil 450 (wound in the opposite direction) when assembled. A spool tube 440 on which the inner coil is wound extends outside assembled coils, and provides a travel path for moveable pole piece 460. As explained above, moveable pole piece 460 is held in an at-rest position (as shown in the assembled drawing) by gravity or by a spring or similar mechanism, but is pulled into the nested coils during overcurrent conditions, and in this "active" position, it raises the series impedance of the embodiment to limit short-circuit current and prevent the system voltage from falling to zero.

Key Design Features

The following characteristics are expected in many embodiments:

- Continuous voltage rating of each differential coil is approximately 10% of the nominal voltage rating. For example, the continuous voltage rating of an embodiment for a 230 KV application would be 23 KV.
- The one-minute voltage rating of each differential coil is equal to the nominal system voltage rating.
- The basic insulation level (BIL) and basic switching surge insulation level (BSL) are matched to the system application. For example, the BIL of an embodiment for a 230 KV application is 900 KV.

The short time current rating of an embodiment is twice the continuous current for ten seconds.

The moveable pole piece should travel from the at rest (low-impedance) position to the actuated (high-impedance) position within about 16 ms (for a 60 Hz application), and return to the at-rest position—after the excess-current condition is alleviated—within about 32 ms.

An exemplary embodiment can be built using the following specific materials and configuration:

Coils formed from 1,000 MCM, copper wire

Four (4) concentric coils of 30 turns, 27 turns, 24 turns and 22 turns, respectively (innermost to outermost; each coil wound in the opposite direction to its predecessor, and all coils connected in parallel)

Inner diameter of first coil is 24 inches

Outer diameter of last coil is 36 inches

Length of concentric coils is 60 inches (since each coil has a different number of turns, the turn-to-turn spacing of each coil is slightly different)

Moveable pole piece is a cylinder, 18 inches in diameter and 60 inches in length Magnetic frame comprises multiple folded, stacked steel sheets; overall dimensions approximately 36 inches by 56 inches by 80 inches Estimated weight of assembly is approximately 6,000 pounds Embodiment low-high impedances are preferably different by a factor of 5 to 10 (i.e., if the reset or low impedance is 0.5Ω, then the actuated or high impedance should be around 2.5Ω to 5.0Ω. These values are typical: a reset impedance might be around 0.1Ω-1.0Ω, while the actuated impedance may be 5~10 times higher.

The applications of the present invention have been described largely by reference to specific examples and in terms of particular allocations of functionality to certain hardware and/or software components. However, those of skill in the art will recognize that automatic protection of high-voltage electrical power distribution facilities can also be achieved by hardware devices that implement the characteristic of embodiments of this invention differently than herein described. Such variations and implementations are understood to be captured according to the following claims.

We claim:

1. An electromechanical differential coil series reactor comprising:

a plurality of conductive coils having non-uniform winding directions; and a moveable magnetically-susceptible element confined to travel along a winding axis of the conductive coils, wherein the plurality of conductive coils present a first electrical impedance when the moveable magnetically-susceptible element is at a first position, the plurality of conductive coils present a second electrical impedance when the moveable magnetically-susceptible element is at a second, different position, the second electrical impedance exceeding the first electrical impedance, and wherein an increase in current through the plurality of conductive coils causes the moveable magnetically-susceptible element to move from the first position to the second, different position.

2. The electromechanical differential coil series reactor of claim 1, further comprising:

a laminated steel frame surrounding the plurality of conductive coils.

3. The electromechanical differential coil series reactor of claim 1 wherein the second electrical impedance is at least five (5) times greater than the first electrical impedance.

4. The electromechanical differential coil series reactor of claim 1 wherein the second electrical impedance is no more than ten (10) times greater than the first electrical impedance.

5. The electromechanical differential coil series reactor of claim 1 wherein the first electrical impedance is between about 0.1Ω and about 1.0Ω.

6. The electromechanical differential coil series reactor of claim 1 wherein the second electrical impedance is between about 0.5Ω and about 5.0Ω.

7. The electromechanical differential coil series reactor of claim 1 wherein the moveable magnetically-susceptible element travels from the first position to the second, different position within about 16 mS.

8. The electromechanical differential coil series reactor of claim 1 wherein the moveable magnetically-susceptible element travels from the second, different position to the first position within about 32 mS.

* * * * *